United States Patent [19]

Tuhro

[11] Patent Number: 5,017,963
[45] Date of Patent: May 21, 1991

[54] IMAGE INPUT DEVICE PROVIDING BACKGROUND DETECTION ARRANGEMENT

[75] Inventor: Richard W. Tuhro, Webster, N.Y.

[73] Assignee: Xerox Corporation, Stamford, Conn.

[21] Appl. No.: 536,826

[22] Filed: May 7, 1990

[51] Int. Cl.$^5$ .............................................. G03G 15/00
[52] U.S. Cl. .................................... 355/218; 355/75; 355/239
[58] Field of Search .................. 355/218, 201, 75, 76, 355/239; 358/456; 382/22, 69

[56] References Cited

U.S. PATENT DOCUMENTS

| | | | |
|---|---|---|---|
| 4,194,221 | 3/1980 | Stoffel | 358/283 |
| 4,243,925 | 1/1981 | Gnuechtel | 318/603 |
| 4,260,248 | 4/1981 | Murata et al. | 355/60 |
| 4,338,020 | 7/1982 | Yukawa et al. | 355/41 |
| 4,391,505 | 7/1983 | Silverberg | 355/3 R |
| 4,415,261 | 11/1983 | Yukawa et al. | 355/75 |
| 4,511,246 | 4/1985 | Nishiyama | 355/75 |
| 4,541,713 | 9/1985 | Maekawa | 355/75 |
| 4,568,181 | 2/1986 | Nishiyama | 355/75 |
| 4,620,781 | 11/1986 | Miyamoto | 355/3 R |
| 4,630,127 | 12/1986 | Fuwa | 358/285 |
| 4,713,550 | 12/1987 | Anzai et al. | 250/560 |
| 4,740,814 | 4/1988 | Folkins | 355/7 |
| 4,746,953 | 5/1988 | Knodt | 355/7 |
| 4,811,115 | 3/1989 | Lin et al. | 358/283 |
| 4,814,833 | 3/1989 | Matsushita | 355/75 |

FOREIGN PATENT DOCUMENTS 2153619 8/1985 United Kingdom .

Primary Examiner—R. L. Moses
Attorney, Agent, or Firm—Mark Costello

[57] ABSTRACT

A document background member is provided with a distinctive background patterning including image data of a selected frequency, that the background can be detected by an image frequency detection circuit. Detection or non-detection of the distinctive patterning enables determination of edges of a scanned original. In an electrophotographic-type copier, an edge sensing ararngement may be provided with a distinctive background patterning against which the image is illuminated, to provide an electronically detectable and clear delineation between document and background for the purpose of edge detection. The edge detection arrangement may also control various erasure arrangements that erase the detectable patterning, to prevent it from showing up in the image. A sensor may be fabricated to produced a strong detectable beating pattern when used against selected background patternings.

36 Claims, 5 Drawing Sheets

IMAGE INPUT DEVICE PROVIDING BACKGROUND DETECTION ARRANGEMENT

The present invention relates generally to a system for detecting the edges of documents scanned with an electronic input scanning device and more particularly to a background against which documents are scanned providing a uniquely detectable pattern.

INCORPORATION BY REFERENCE

U.S. Pat. No. 4,194,221 to Stoffel and U.S. Pat. No. 4,811,115 to Lin et al. are specifically incorporated herein by reference for their teachings.

BACKGROUND OF THE INVENTION

In the reproduction of copies of an original from video image data created, for example, by electronic input scanning from an original document, it is often desirable to provide functions dependent on determining the exterior edges of the document. Such features include, for example, automatic magnification, automatic two-up copying, background deletion to avoid storing a document requiring more space than necessary, etc. In the analogous field of light lens copying this has commonly been done by providing a background, against which the document is viewed, that has a tendency to be distinguishable from the image. Thus, for example, backgrounds have been provided with a yellow color, with a black color, with a white color with a whiter than white color, and various other alternatives. All these alternatives work to some extent, but each suffers from the problem that for some documents the background is not well distinguishable from the sheet edge. Thus, black edges of a sheet cannot be distinguished against a black background, canary paper may not be distinguishable against a yellow background, white paper on a white background is questionably detectable, etc.

Various methods are known for distinguishing types of images in a document based on the frequency of the image data. Thus, for example, in U.S. Pat. No. 4,194,221 to Stoffel, this problem was addressed by applying a discrimination function instructing the image processing system as to the type of image data present and particularly, an auto correlation function to the stream of pixel data, to determine the existence of high frequency half-tone image data.

Stoffel describes a method of processing automatically a stream of image pixels representing unknown combinations of high and low frequency half-tones, continuous tones, and/or lines to provide binary level output pixels representative of the image. The described auto correlation function is applied to the stream of image pixels and, for the portions of the stream that contained high frequency half-tone image data, notes a large number of closely spaced peaks in the resultant signal. GB No. 2,153,619A provides a similar determination of the type of image data. However in that case, a threshold is applied to the image data at a certain level, and subsequent to thresholding the number of transitions from light to dark within a small area is counted. The system operates on the presumption that data with a low number of transitions after thresholding is probably a high frequency half-tone or continuous tone image. In U.S. Pat. No. 4,811,115 to Lin et al, a method and apparatus for applying an auto correlation function for the determination of the presence of half-tone image data is shown. The auto correlation function is calculated for the stream of half-tone image data at selected time delays which are predicted to be indicative of the image frequency characteristics, without prior thresholding. The arithmetic function used in the auto correlation system of U.S. Pat. No. 4,811,115 to Lin is an approximation of the auto correlation function using logical functions and addition, rather than the multiplication function used in U.S. Pat. No. 4,194,221 to Stoffel. Peaks in the resulting auto correlated function are detected to determine whether half-tone image data of selected frequencies are present.

Of interest to the problem of background detection are: U.S. Pat. No. 4,338,020 to Yukawa et al. which in an electrophotographic device provides a colored document background and an arrangement for optimizing detection thereof, U.S. Pat. No. 4,511,246 to Nishiyama, U.S. Pat. No. 4,568,181 to Nishiyama, and U.S. Pat. No. 4,713,550 to Anzai et al. show, in an electrophotographic device, a series of spaced light detectors which detect light reflected from a background to determine which of a series of paper sizes is registered at an edge position on a platen. U.S. Pat. No. 4,415,261 to Yukawa et al. provides in an electrophotographic device a detectable marking on the interior surface of a platen cover with fluorescent paint or pigment. The markings are detectable by an undisclosed sensor. U.S. Pat. No. 4,541,713 to Maekawa teaches in an electrophotographic device that a document size detecting arrangement may be provided with a platen cover having a plurality of colored portions, with a light receiving arrangement adapted to distinguish the colored portion from the rest of the surface. U.S. Pat. No. 4,630,127 to Fuwa teaches a platen cover with two sets of linear arrays of light sources in main and sub scanning directions, and a sensor for detecting the light sources, detection of given number indicating document size. U.S. Pat. No. 4,620,781 to Miyamoto teaches the use of a specularly reflective background surface, and the use of a sensor positioned to receive light scatterably reflected by the original document, but not light specularly reflected by the background, to allow detection the edges of the document. U.S. Pat. No. 4,260,248 to Murata et al teaches adjustment of the lens focus, based on known copy paper size and amount of magnification desired. U.S. Pat. No. 4,746,953 to Knodt teaches data input regarding sheet size with touch sensitive switches along the edges of the platen. U.S. Pat. No. 4,391,505 to Silverberg teaches lead edge registration of a document on a transport base on occlusion of a spectrally reflective patch, and U.S. Pat. No. 4,243,925 to Gnucehtel teaches registration of output sheets in a input scanning device by counting encoder revolutions. All of the above-mentioned patents are incorporated by reference for their teachings.

SUMMARY OF THE INVENTION

In accordance with the invention, an image input terminal for deriving an electronic representation of a scanned image is provided with a distinctive background patterning against which the image is scanned, to provide an electronically detectable and clear delineation between document and background for the purpose of edge detection.

In accordance with one aspect of the invention, a document background is provided with a distinctive image pattern including image data of a selected frequency and angle, that can be detected by an image frequency detection circuit. Detection or non detection of the distinctive pattern enables determination of edges of a scanned original.

In accordance with another aspect of the invention, in an electrophotographic-type copier, an edge sensing arrangement may be provided with a distinctive background patterning against which the image is illuminated, to provide an electronically detectable and clear delineation between document and background for the purpose of edge detection. The edge detection arrangement may also control various erasure arrangements that erase the detectable patterning, to prevent it from showing up in the image. Alternatively, the patterning may be printed to allow detection by the edge sensing arrangement, but not cause photoreceptor response.

In accordance with yet another aspect of the invention, a light sensitive device may be constructed so that detection of a background patterning will produce a strong beating pattern at a known frequency.

The invention uses known pattern detection techniques, together with known image editing processes in an automated fashion to provide for background detection and accordingly, document edge detection. By selecting a background patterning not commonly found in documents to be copied or imaged, the background detection arrangement can be made highly reliable. Using known image editing processes, the visible patterning may be removed from the process images. The invention has application to input scanners, and copiers having the capability of a pre-scan function.

These and other aspects of the invention will become apparent from the following description used to illustrate a preferred embodiment of the invention read in conjunction with the accompanying drawings in which:

FIGS. 1A and 1B show a side elevational view of an exemplary input scanner including a platen cover with a background surface in accordance with the invention, with FIG. 1B showing a not-to-scale version of the background patterning of the invention;

FIG. 2 demonstrates a block diagram of an image data processing system wherein the present invention finds particular use;

Figure 1:
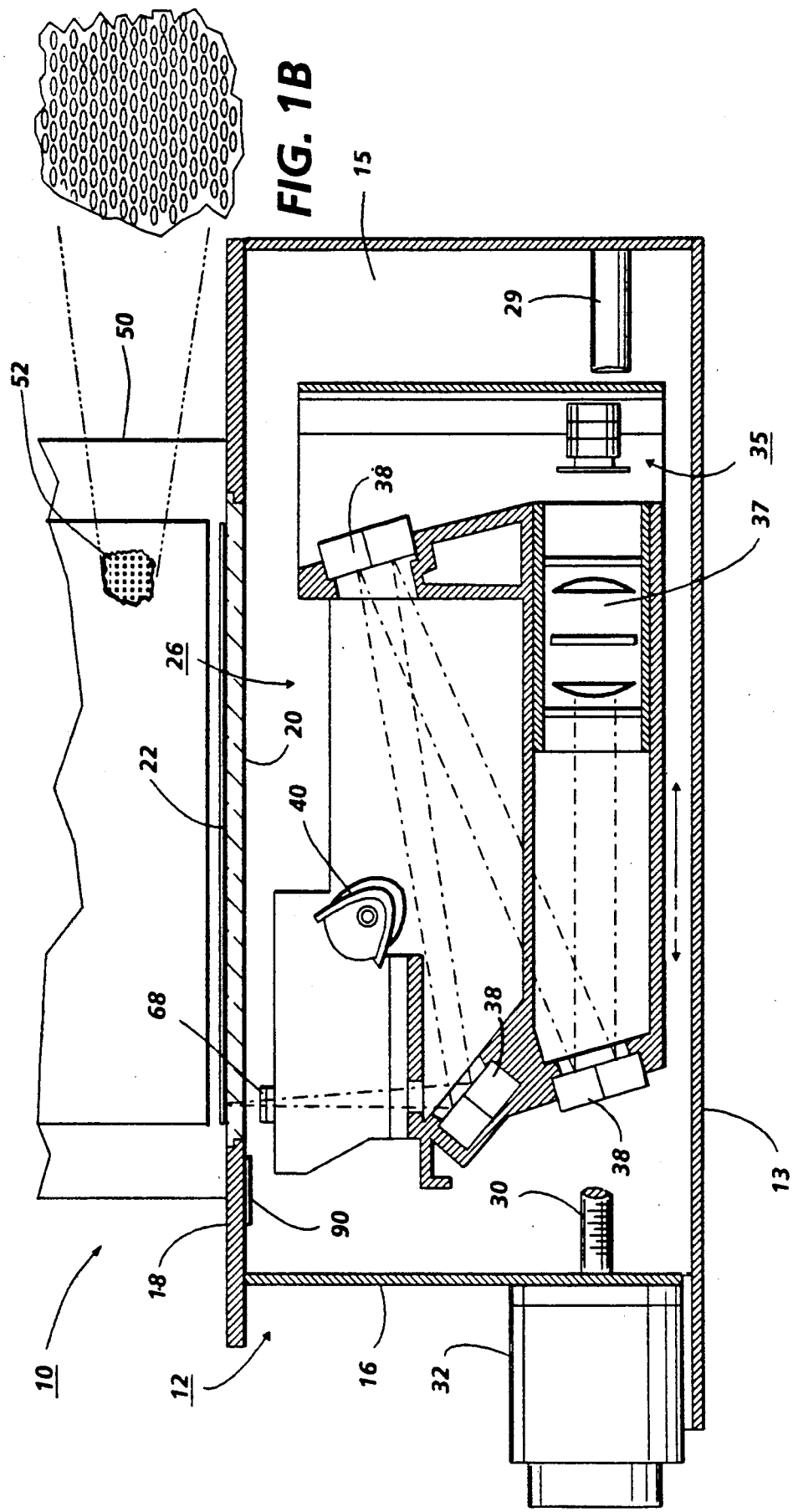

With reference now to the drawings wherein the showings are for the purpose of illustrating a preferred embodiment of the invention and not for limiting same, in an application incorporating the present invention, FIG. 1 demonstrates an exemplary input scanner, designated generally by the numeral 10. Scanner 10 includes a housing 12 with base 13, sides 15 (rear side only shown), and ends 16. The top 18 of housing 12 incorporates a generally rectangular transparent platen 20, typically glass, sized to accommodate the largest document original 22 to be scanned. As will be understood, a document 22 to be scanned is located either manually or by a suitable automatic document handler or feeder (not shown), on platen 20 for scanning. A scan carriage 26 is movably supported within housing 12 on base 13 for reciprocable movement underneath platen 20 on one or more longitudinally extending rails 29. Carriage driving means in the form of a drive screw 30 threadedly engaged with carriage 26 is provided, rotation of screw 30 in either a clockwise or counter-clockwise direction by a reversible carriage driving step motor 32 serving to move carriage 26 in either a forward or reverse direction as shown by the arrows in drawing FIG. 1.

A scanning array 35 such as a CCD is suitably mounted on scan carriage 26 in predetermined operative relation with platen 20 so as to scan the document resting thereon. Suitable optical means, exemplified here by lens 37 and mirrors 38, are provided to focus array 35 on a line-like area extending across the width of platen 20 and perpendicular to the direction of movement of carriage 26. Lamp 40 on carriage 26 illuminates the line-like area on which array 35 is focused. A suitable pixel clock 38 (shown in FIG. 2) provides the necessary clock signals for operating array 35.

While a single scanning array 35 is shown and described, plural arrays may instead be envisioned. Additionally, in an input scanner having a matrix scanning array where mxn portion, or the entire image are scanned, relative movement of the document and the scanner might be accomplished by the electronic polling of the sensor arrangement. Finally, an original document to be scanned may include single cut sheets of paper, continuous webs of paper, books and other substantially opaque originals from which copying or imaging may be desired.

Platen cover 50 holds the document in position as it is scanned. In a typical configuration, platen cover 50 is connected to an upper surface of housing 12 with a hinged mount (not shown) to enable the cover to be opened and closed. Usually, although not necessarily, the platen cover has a size larger than the platen so that it substantially covers the platen when moved to a closed position. Background member 52 is supported on the platen cover 50, in engagement with the document against platen 20 when the cover is in a closed position to hold the document in position. A printed pattern distinct from that usually found in documents to be scanned is provided on the background member 52, as shown in the inset FIG. 1B. Thus, for example, commonly used printing frequencies occur at 90 spi, 45 spi, 65 spi, 100 spi and 150 spi. Accordingly satisfactory frequencies for the background pattern are somewhat removed from these frequencies and include 16 and 33 spi or other frequencies of patterns that do not commonly occur in documents to be copied.

In an image processing arrangement incorporating the present invention, such as that described, for example, in U.S. Pat. No. 4,194,221 to Stoffel or U.S. Pat. No. 4,811,115 to Lin et al., FIG. 2 demonstrates handling of image data, which may be derived from raster input scanner 10. The stream of image pixels derived from scanning array 35 is fed to a buffer 120. Buffer 120, which comprises any suitable commercially available serial in/serial out multi-row buffer having a bit storage capacity sufficient to temporarily store lines of image pixels, permits processing of image data in blocks of several lines.

Image data is made available to the image processing system along data bus 122. Image data at this point is in its raw gray format, for example, 6-8 bits per pixel. To detect the presence of high frequency half-tone image data, a one dimensional block of image pixels is unloaded from buffer 120 onto a data bus 122. The block of image pixels is passed to an image frequency detector 124 comprised of detectors for high and low frequency image data for subsequent image segmentation. An output on line 126 instructs the image processing control 128 to handle the data in accordance with whether high frequency or low frequency half-tone image data or continuous tone image data has been detected.

Image processing control 128 serves essentially as a switch to allow data from the frequency dependent image processing devices, collectively 130, to transfer through bus 136 to an output buffer 138 in accordance with the detection of data in the particular mode. Image processing control 128 controls a data bus 136 to allow data transfer from frequency dependent image processing devices 130, in accordance with the signals passed thereto from image frequency detection devices 124. Each processing section processes all image data in accordance with its function, but only that data appropriately processed is allowed to pass to the output buffer 138. Data improperly processed is discarded.

Figure 2:
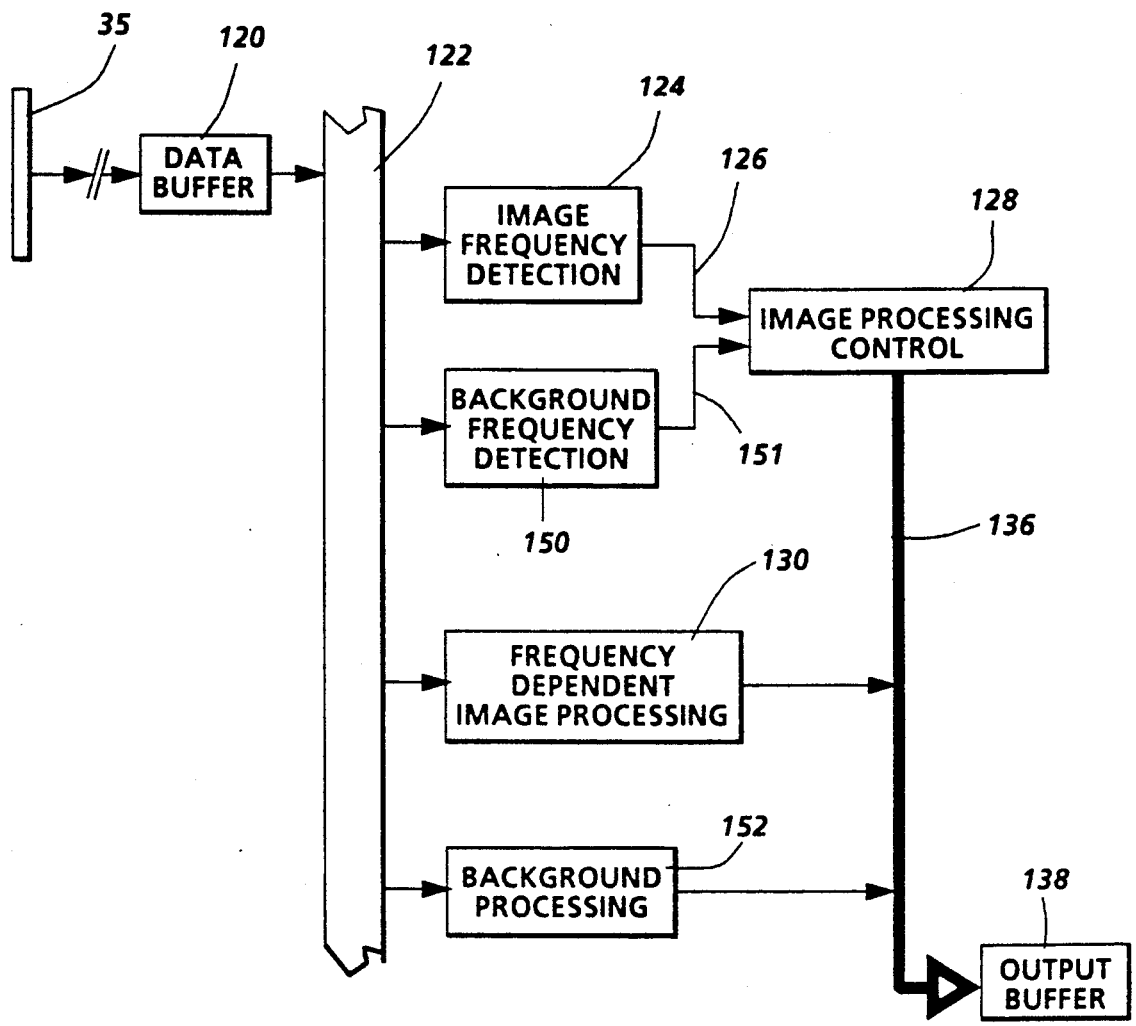

Thus far the device has been described along the lines taught by U.S. Pat. No. 4,194,221 to Stoffel. In accordance with the invention, as illustrated in FIG. 2, the image data from sensor array 35 is also directed from bus 122 to background frequency detection device 150. Upon detection of the background pattern, background frequency detection device 150 signals image processing control along line 151 to allow the data transfer from background processing device 152. In most cases, the data transferred from background processing device 152 upon detection of background will be while data, deleting the background image data from the sensed image area, although any new background color, including black, grey, or colors where appropriate could be substituted for the image data.

Figure 3:
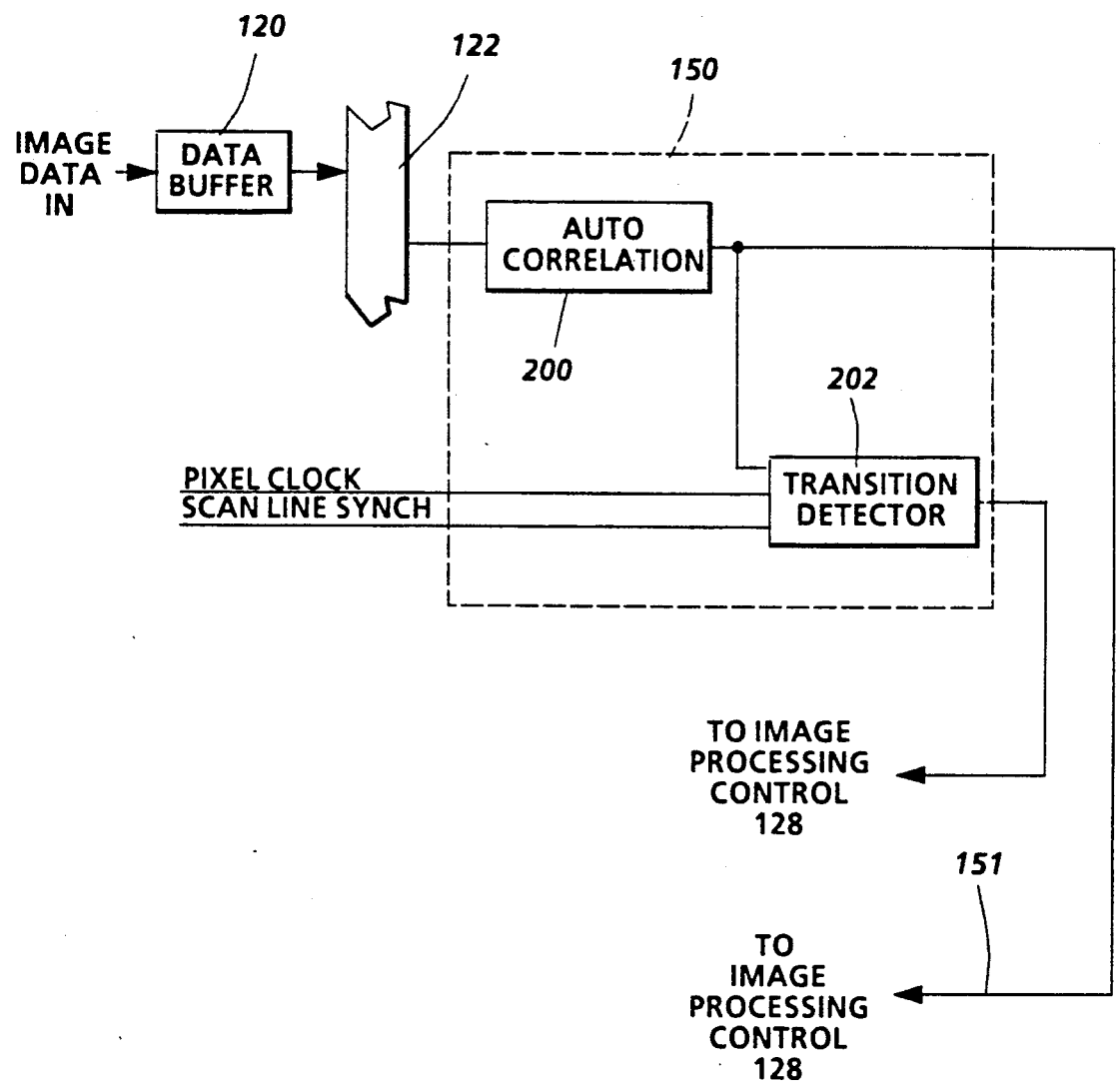
FIG. 3 is a block diagram of the main system elements of background detection device.

In accordance with FIG. 3, background frequency detection device 150 may comprise an auto correlation device 200 similar to that described in U.S. Pat. No. 4,194,221 to Stoffel or U.S. Pat. No. 4,811,115 to Lin et al., and set for detection of the frequency selected for the pattern on background member 52 supported on the platen cover 50. Additionally, a transition detector arrangement 202 may be provided, which detects the transition from background to image, or vice versa, and notes the position of the transition based on pixel position in a scan line and/or scan line on a page, based on signals provided to detector 202 from standard pixel clock and line synch signals provided thereto. These position signals may thereafter be used for well known functions including automatic magnification, automatic two-up copying, sheet size requirement matching, etc.

Figure 4:
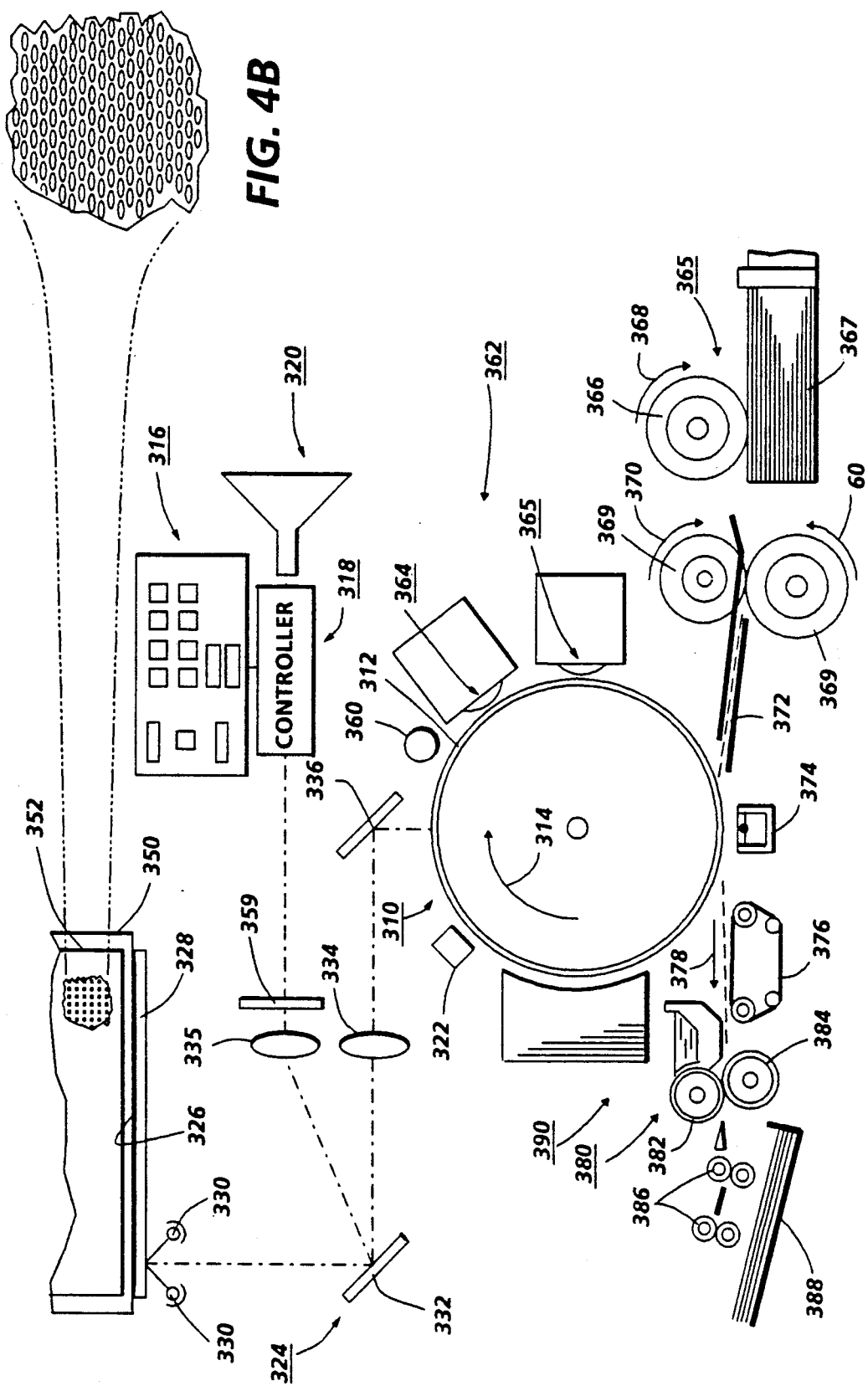
FIGS. 4A and 4B show an electrophotographic system with an image sensing arrangement and erasure capability incorporating the present background detecting system.

In another embodiment of the invention, in the electrophotographic device shown in FIG. 4, similar to that of U.S. Pat. No. 4,740,814 to Folkins, a light lens-type copier is also provided with a raster input device that allows a document to be previewed for the purpose of editing. Accordingly, as shown in FIG. 4, the electrophotographic printing machine employs a drum 310 having a photoconductive surface 312. Drum 310 moves in the direction of arrow 314 to advance successive portions of photoconductive surface 312 sequentially through the various processing stations disposed about the path of movement thereof.

In operation, the operator may control operation of the device through a control panel 316. Control panel 316 is coupled to a device controller 318, preferably, a microprocessor driven device connected to the various processing stations within the electrophotographic printing machine to control their operation in accordance with a pre-programmed series of operations. In addition, controller 318 may be electrically coupled to a display 320, adapted to display the copy to be made electronically. Thus, initially, display 320 displays image of the original document. The image displayed shows the effects of the various manipulations performed thereon by the operator through the utilization of control panel 316.

With continued reference to FIG. 4, initially, a portion of photoconductive surface 312 passes by a corona generating device 322, which charges photoconductive surface 312 to a relatively high substantially uniform potential. The charged portion of photoconductive surface 312 is advanced through imaging station or exposure station 324. At exposure station 324, an original document is positioned face down on a transparent platen 328, and illuminated with lamp 30. Light rays reflected from the document are reflected from mirror 332, through lens 334 and lens 335 to form light images thereof. In accordance with the invention, platen cover 350 holds the document in position against platen 328 as it is scanned. In a typical configuration, platen cover 350 is connected to an upper surface of a housing (not shown) with a hinged mount (not shown) to enable the cover to be opened and closed over the platen. Usually, although not necessarily, the platen cover has a size larger than the platen so that it substantially covers the platen when moved to a closed position. Background member 352 is supported on platen cover 350, in engagement with the document against platen 328 when the cover is in a closed position. A printed pattern distinct from that usually found in documents to be scanned is provided on background member 352, as shown in the inset FIG. 4B.

Light image reflected from the document is transmitted through lens 335 to sensor array 354, or the like. Mirror 332, lens 335, sensor array 354, and lens 334 move in a timed relationship with lamps 334 so as to be in the proper relationship with respect thereto for forming the light image. Mirror 336 is positioned in the light path of the light image transmitted through lens 334. The light image transmitted through lens 334 is reflected by mirror 336 onto the charged portion of photoconductive surface 312 to record an electrostatic latent image thereon corresponding to the original document.

Array 354, responsive to the light image transmitted thereto, generates a video image corresponding to the sensed document. Array 354 is electrically coupled to controller 318 and to control panel 316, so that the sensed image is displayed on display 320. The operator selects the variations desired in the copy through the use of control panel 316 which, in turn, transmits electrical signals indicative thereof to controller 318. Display 320 displays the varied copy. Controller 318 is also electrically connected to the various processing stations in the printing machine. In this way, controller 318 controls these processing stations to produce the operator selected adjustments to the copy of the original document.

In the copying mode, the electrostatic latent image is recorded on the photoconductive surface via mirror 336 positioned in the path of the light image transmitted from lens 334 so as to reflect the light image of the original document onto the charged portion of photoconductive surface 312. The region between successive electrostatic latent images and the lateral marginal regions of the electrostatic latent image are discharged by an array of erase lamps 360. Erase lamp array 360 also deletes selected portions of the electrostatic latent image responsive to editing commands from the controller 318. Erase lamp array 360 extends across the width of drum 310 in a direction substantially parallel to the longitudinal axis thereof. In order to delete selected portions of the original document in the copy, the operator, through control panel 316, defines coordinates or portions of the original document to be deleted from the copy. Responsive to these position commands, controller 318 controls the selective, independent energization of the lamps in array 360. This defines the duration of time that each of the erase lamps 40 are energized. Thus, the selected lamps in the array are turned on at the appropriate time to delete the desired portion of the electrostatic latent image so that the resultant copy has the selected portion of the original document deleted therefrom. Furthermore, array 360 is energized to discharge the region between electrostatic latent images, i.e., the inter-image region. In addition, side lamps are continuously energized to discharge the lateral marginal region of the drum outside the area of the electrostatic latent image on the side portions thereof.

Development system 362, may include first and second developer units 364 and 365, where developer unit 364 develops the electrostatic latent image with black toner particles while developer unit 366 develops the electrostatic latent image with toner particles of a color other than black, e.g. red. CPU 318 controls energization of either developer unit 364 or developer unit 366 to develop the electrostatic latent image. The developer units are moved from a position remote from the photoconductive surface to an operative position adjacent thereto.

After development, drum 310 advances the developed latent image and is transferred to a sheet of support material at transfer station D. A sheet of support material is moved into contact with the powder image by a sheet feeding apparatus 365, including a feed roll 366 contacting the uppermost sheet of a stack of sheets 367. Feed roll 366 rotates in the direction of arrow 368 to advance the uppermost sheet into the nip defined by forwarding rollers 369. Forwarding rollers 369 rotate in the direction of arrow 370 to transport the sheet into chute 372. Chute 372 directs the advancing sheet of support material into contact with photoconductive surface 312 of drum 310 so that the toner powder image developed thereon contacts the advancing sheet at the transfer station.

Preferably, the transfer station includes a corona generating device 374 which sprays ions onto the backside of the sheet. This attracts the toner powder image from photoconductive surface 312 to the sheet. After transfer, the sheet continues to move on conveyor 376, in the direction of arrow 378, to a fusing station.

A fusing station includes a fuser assembly 380 which permanently affixes the transferred toner powder image to the sheet. The sheet passes between fuser roller 382 and back-up roller 384 with the powder image contacting fuser roller 382. In this manner, the powder image is permanently affixed to the sheet. After fusing, forwarding rollers 386 advance the sheet to catch tray 388 for subsequent removal from the printing machine by the operator. If a color highlight copy is being produced, the sheet may be recirculated to the transfer station so that the next toner powder image may be transferred thereto. Thereafter, the sheet passes through the fusing station to permanently affix this powder image thereto and the resultant highlight color copy advances to catch tray 388.

After the powder image is transferred from photoconductive surface 312 to the copy sheet, drum 310 rotates the photoconductive surface to a cleaning station 390. At cleaning station 390, one of several cleaning systems, known for electrophotographic applications, removes the residual particles adhering to photoconductive surface 312.

Figure 5:
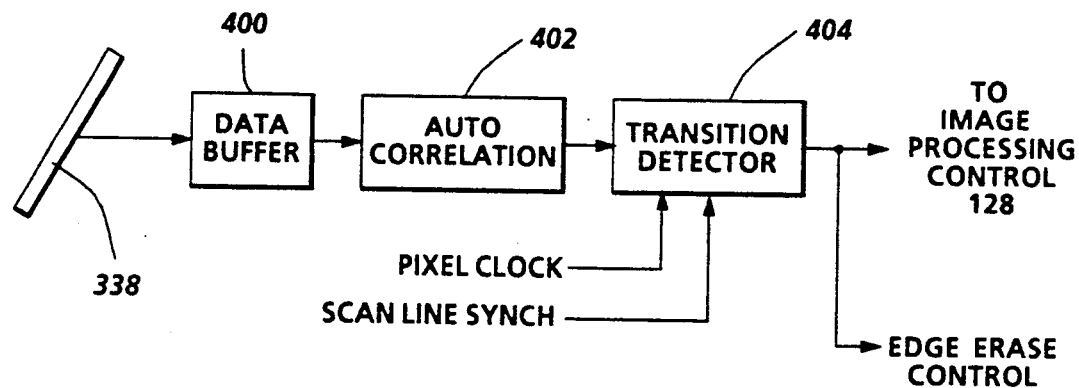
FIG. 5 shows a block diagram of the main system elements of the background detection device for use in the electrophotographic system of FIG. 4.

In accordance with the invention and as shown in FIG. 5, the image data derived by sensor array 338, is directed to controller 318, which processes the data to determine the delineation between background and the document scanned. Accordingly, image data from image sensor 338 is directed to data buffer 400, which in turn directs the data to an autocorrelation device 402, with the output of this device indicating the presence or absence of the background patterning frequency. In combination with the output of auto correlation device 402, a transition detector 404 detects the position of the transition between background and document, in terms of pixel and scan line position. Transition detector 404 provides this information to position based processing controls, and to the edge erase control. Thus, edge erase lamps 360 are activated upon detection of the distinctive background patternings.

In accordance with another aspect of the invention, and similar to the arrangement described in U.S. Pat. No. 4,415,261 to Yukawa et al., the background pattern may be printed on the platen cover with a paint or ink or other material having a reflection response detectable by sensors, but to which photoreceptor 312 is not sensitive. In this case, edge erase may not be required for the purpose of removing the patterned background, although it may still be desirable for other edge erase functions.

Figure 6:
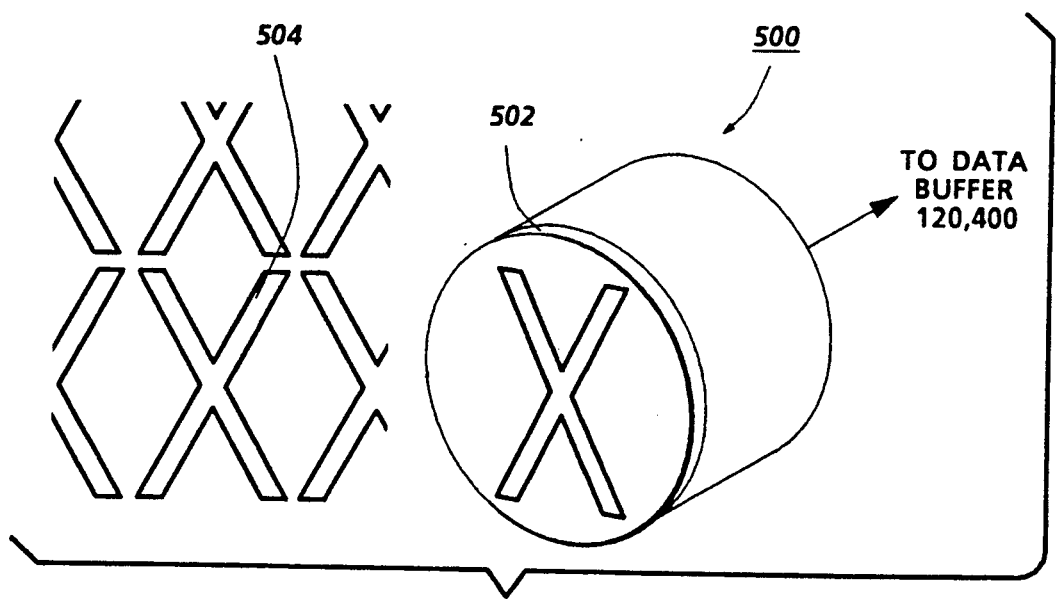
FIG. 6 shows a single sensor for use in electronically reading a background patterning in a manner creating a detectable frequency response.

In yet another embodiment of the invention, as shown in FIG. 6, a single sensor 500 may be provided with a mask 502 corresponding to a small unit 504 of the background patterning. Thus, for example, for a background pattern including an cross pattern, or a similar pattern not normally encountered at the edge of a document, sensor 500 is masked to provide sensing of the cross pattern. With relative movement of the document and sensor, a strong beating pattern will occur at a frequency detectable by an auto correlation arrangement, perhaps similar to that described in FIGS. 3 or 5. With detection of the beat frequency, the edges of the document may be correlated with relative position of the sensor and the document.

The invention has been described with reference to a preferred embodiment. Obviously modifications will occur to others upon reading and understanding the specification taken together with the drawings. These embodiments are but examples, and various alternatives, modifications, variations or improvements may be made by those skilled in the art from this teaching which are intended to be encompassed by the following claims.

I claim:

1. An input scanner comprising:
   an original document support;
   sensor means for providing a stream of image data indicative of sensed light intensity;
   illumination means for illuminating an original document at said original document support, and directing light reflected therefrom to said sensor means for imaging;

means for providing relative movement between said sensor means and an original document;

said document support means including a background member having a distinctive background patterning thereon, against which an original document is supported for illumination; and means for detecting said distinctive background patterning in said stream of image data, said detection indicating edges of an original document.

2. The device as defined in claim 1 and including: means for correlating detection of edges of an original document, with a position of an original document on said original document support.

3. The device as defined in claim 2 wherein said stream of image data indicative of sensed light intensity is made up of scan lines of pixels, and said position of an original document on said original document support is identifiable in terms of scan lines and pixels.

4. The device as defined in claim 1 wherein said distinctive background patterning is comprised of a series of markings having a known frequency.

5. The device as defined in claim 4 wherein said means for detecting said distinctive background patterning in said stream of image data includes an auto correlation function for detection of said known frequency.

6. The device as defined in claim 5 wherein said auto correlation function provides an output indicative of detection of image data in said stream of image data of said known frequency.

7. The device as defined in claim 6 wherein said stream of image data indicative of sensed light intensity is made up of scan lines of pixels, and said position of an original document on said original document support is identifiable in terms of scan lines and pixels.

8. The device as defined in claim 6 and including a transition detector to correlating detection of said background patterning with position of an original document on said original document support in terms of scan lines and pixels.

9. An input scanner comprising:

a linear array of light sensitive devices providing a stream of image data indicative of sensed light intensity over a given period in an imaging process;

a transparent platen adapted to support a document during the imaging process;

illumination means for illuminating an original document supported on said platen and directing light reflected therefrom to said array of light sensitive devices;

means for providing relative movement between said array of light sensitive devices and an original document;

a platen cover adapted to cover said platen and documents supported thereon during the imaging process when in a closed position, and having a face adjacent said platen when in said closed position, said face having imprinted thereon a distinctive background patterning; and means for detecting said distinctive background patterning in said stream of image data, said detection indicating edges of an original document.

10. The device as defined in claim 9 and including: means for correlating detection of edges of an original document, with a position of an original document on said platen.

11. The device as defined in claim 10 wherein said stream of image data indicative of sensed light intensity is made up of scan lines of pixels, and said position of an original document on said platen is identifiable in terms of scan lines and pixels.

12. The device as defined in claim 9 wherein said distinctive background patterning is comprised of a series of markings having a known frequency.

13. The device as defined in claim 12 wherein said means for detecting said distinctive background patterning in said stream of image data includes an auto correlation function for detection of said known frequency.

14. The device as defined in claim 13 wherein said auto correlation function provides an output indicative of detection of image data in said stream of image data of said known frequency.

15. The device as defined in claim 14 wherein said stream of image data indicative of sensed light intensity is made up of scan lines of pixels, and said position of an original document on said platen is identifiable in terms of scan lines and pixels.

16. The device as defined in claim 15 and including a transition detector to correlate detection of said background patterning with the position of an original document on said platen in terms of scan lines and pixels.

17. An input scanner comprising:

a light sensitive device providing a stream of image data indicative of sensed light intensity over a given period in an imaging process;

a document support adapted to support an original document during the imaging process;

illumination means for illuminating an original document supported on said platen and directing light reflected therefrom to said light sensitive device;

means for providing relative movement between said array of light sensitive devices and an original document;

said document support including a background surface against which documents are illuminated during the imaging process, and having imprinted thereon a distinctive background patterning; and means for detecting said distinctive background patterning in said stream of image data, said detection indicating edges of an original document.

18. The device as defined in claim 17 and including: means for correlating detection of edges of an original document with a position of an original document at said document support.

19. The device as defined in claim 18 wherein said stream of image data indicative of sensed light intensity is made up of scan lines of pixels, and said position of an original document on said original document support is identifiable in terms of scan lines and pixels.

20. The device as defined in claim 17 wherein said distinctive background patterning is comprised of a series of markings having a known frequency.

21. The device as defined in claim 20 wherein said means for detecting said distinctive background patterning in said stream of image data includes an auto correlation function for detection of said known frequency.

22. The device as defined in claim 21 wherein said auto correlation function provides an output indicative of detection of image data in said stream of image data of said known frequency.

23. The device as defined in claim 17 wherein said stream of image data indicative of sensed light intensity is made up of scan lines of pixels, and a position of an original document on said original document support is identifiable in terms of scan lines and pixels.

24. The device as defined in claim 23 and including a transition detector to correlate detection of said background patterning with a position of an original document at said document support in terms of scan lines and pixels.

25. An electrophotographic device comprising:
an electrophotographic imaging system operable in an imaging process for deriving an image of an original document on a photoconductive surface, developing the image with a developer material, and imagewise transferring the developed image to a final substrate;
a light sensitive device providing a stream of image data indicative of sensed light intensity over a given period in said imaging process;
a document support adapted to support an original document during the imaging process;
illumination means for illuminating an original document supported on said document support and directing light reflected therefrom to said light sensitive device;
means for providing relative movement between said light sensitive device and an original document;
said document support including a background surface against which documents are illuminated during the imaging process, and having imprinted thereon a distinctive background patterning; and
means for detecting said distinctive background patterning in said stream of image data, said detection indicating edges of an original document.

26. The device as defined in claim 25 and including:
means for correlating detection of edges of an original document with a position of an original document at said document support.

27. The device as defined in claim 26 wherein said stream of image data indicative of sensed light intensity is made up of scan lines of pixels, and said position of an original document on said original document support is identifiable in terms of scan lines and pixels.

28. The device as defined in claim 25 wherein said distinctive background patterning is comprised of a series of markings having a known frequency.

29. The device as defined in claim 28 wherein said means for detecting said distinctive background patterning in said stream of image data includes an auto correlation function for detection of said known frequency.

30. The device as defined in claim 29 wherein said auto correlation function provides an output indicative of detection of image data in said stream of image data of said known frequency.

31. The device as defined in claim 25 wherein said stream of image data indicative of sensed light intensity is made up of scan lines of pixels, and a position of an original document on said original document support is identifiable in terms of scan lines and pixels.

32. The device as defined in claim 31 and including a transition detector to correlate detection of said background patterning with a position of an original document at said document support in terms of scan lines and pixels.

33. The device as defined in claim 25 wherein said electrophotographic system includes means for neutralizing charge on said photoconductive surface in non-imaged areas.

34. The device as defined in claim 33, wherein said means for neutralizing charge in non-imaged areas on said photoconductive surface is controlled in accordance with detection of said background patterning.

35. The device as defined in claim 25 wherein said background patterning is imprinted on said background surface with a material having a reflection response detectable by said light sensitive device, but to which the electrophotographic system is not responsive.

36. An input scanner comprising
a light sensitive device providing a stream of image data indicative of sensed light intensity over a given period in an imaging process;
a document support adapted to support an original document during the imaging process;
illumination means for illuminating an original document supported on said platen and directing light reflected therefrom to said light sensitive device;
means for providing relative movement between said array of light sensitive devices and an original document;
said document support including a background surface against which documents are illuminated during the imaging process, and having imprinted thereon a background patterning formed from a pattern of uniform shapes;
said light sensitive device having a mask thereover complementary to said shapes; and
means for detecting a beating pattern in said stream of image data, resulting from interference between said background patterning and detection thereof by said masked light sensitive device, said detection of said beating pattern indicating edges of an original document.

* * * * *